United States Patent [19]

Culbertson et al.

[11] 4,101,089
[45] Jul. 18, 1978

[54] INTEGRAL STORAGE ASSEMBLY FOR DETACHABLE POWER CORDS

[75] Inventors: Richard Culbertson; Paul J. Klucznik, both of Manlius, N.Y.

[73] Assignee: General Electric Company, Syracuse, N.Y.

[21] Appl. No.: 799,459

[22] Filed: May 23, 1977

[51] Int. Cl.² .......................................... B65H 75/36
[52] U.S. Cl. ................................................ 242/85.1
[58] Field of Search .............................. 242/85.1, 85; 191/12.2 R, 12.4; 339/119

[56] References Cited

U.S. PATENT DOCUMENTS

| | | | |
|---|---|---|---|
| 2,143,529 | 1/1939 | White | 242/85.1 X |
| 2,244,619 | 6/1941 | Heise | 242/85.1 X |
| 2,693,001 | 11/1954 | Vance | 242/85.1 X |
| 3,588,389 | 6/1971 | Sato | 242/85 |

FOREIGN PATENT DOCUMENTS

| | | | |
|---|---|---|---|
| 112,117 | 10/1944 | Sweden | 242/85.1 |

Primary Examiner—Edward J. McCarthy
Attorney, Agent, or Firm—Carlos Nieves; George R. Powers; Leonard J. Platt

[57] ABSTRACT

Storage assembly for detachable power cords having male and female ends, constructed integrally with an external surface of a portable electrical device that can be energized either by self contained batteries or by house power, the storage assembly providing convenient storage for the power cord during times when the cord is not in use. The storage assembly comprises a wrapping surface constructed integrally with and extending at approximately right angles to the external surface and arranged in a closed path on the external surface, at least a portion of the wrapping surface having an overhanging extension disposed approximately parallel to the external surface, whereby the power cord can be wrapped around the wrapping surface and held in place between the external surface and the overhanging extension. The storage assembly further comprises means for securing both the male and female ends of the power cord.

10 Claims, 7 Drawing Figures

INTEGRAL STORAGE ASSEMBLY FOR DETACHABLE POWER CORDS

BACKGROUND OF THE INVENTION

The invention pertains generally to power cord storage structures for portable electrical devices. In most instances the power cord is permanently connected to such devices with only the plug end free. Various storage structures have been designed for wrapping and securing the cord externally or internally of the device for greater convenience in handling the cord. With respect to some portable devices such as portable tape recorders and TV sets, the power cord is completely detachable, having the usual male plug end for connection to a source of house power and a female jack end for connection to the device. There is ordinarily no provision for storing the cord together with the device, or the storage means provided are crude and inadequate. For example, the battery compartment offering limited space may be used for this purpose for internal storage of the cord, or the cord may be wound around the body of the device and the ends intertwined with the cord windings for external storage.

SUMMARY OF THE INVENTION

It is accordingly an object of the invention to provide a novel storage assembly for detachable power cords used to energize a portable electrical device, which structure will conveniently store the cord on an external surface of said device.

It is a further object of the invention to provide a novel storage assembly as above described that firmly secures both the male and female ends of the power cord.

It is another object of the invention to provide a novel storage assembly as above described that will accommodate different length cords.

It is yet another object of the invention to provide a novel storage assembly that may be inexpensively constructed as an integral part of the housing of the portable electrical device.

These and other objects of the invention are accomplished by a storage assembly that is integrally constructed with an external surface of the housing of an electrical device, comprising a wrapping surface extending at approximately right angles to the external surface and arranged to provide a closed path on the external surface, at least a portion of the wrapping surface having an outwardly projecting overhanging extension disposed approximately parallel to the external surface, whereby the power cord can be wrapped around the wrapping surface and held in place between the external surface and overhanging extension. The storage assembly further comprises first means joined to the external surface for securing the female jack end of the cord and second means joined to the external surface for securing the male plug end of the cord.

In accordance with a first, more specific embodiment of the invention, the wrapping surface is composed of the outer surface of a four-sided walled enclosure and the overhanging extension is in the form of a flange joined to two opposite sides of the walled enclosure. The first means, formed outside the walled enclosure, includes at least one pair of parallel rib structures spaced apart by an amount corresponding to a dimension of the female jack such as its thickness or width so as to securely hold the jack when placed between said rib structures. The second means, formed within the walled enclosure, includes a well and a pair of narrow, spring loaded grooves for receiving the male plug.

In accordance with a second, more specific aspect of the invention, the wrapping surface and overhanging extension are composed of a plurality of outwardly projecting posts. The first means, formed within the closed path, includes a pair of inwardly projecting L shaped members for grasping the female jack end. The second means, also formed within the closed path, includes a well and a further pair of inwardly projecting L shaped members for grasping the male plug end.

BRIEF DESCRIPTION OF THE DRAWING

While the specification concludes with the claims which particularly point out and distinctly define that subject matter which is regarded as the invention, it is believed the invention will be more clearly understood when considering the following detailed description and the accompanying figures of the drawing in which:

DESCRIPTION OF THE PREFERRED EMBODIMENTS

Figure 1:
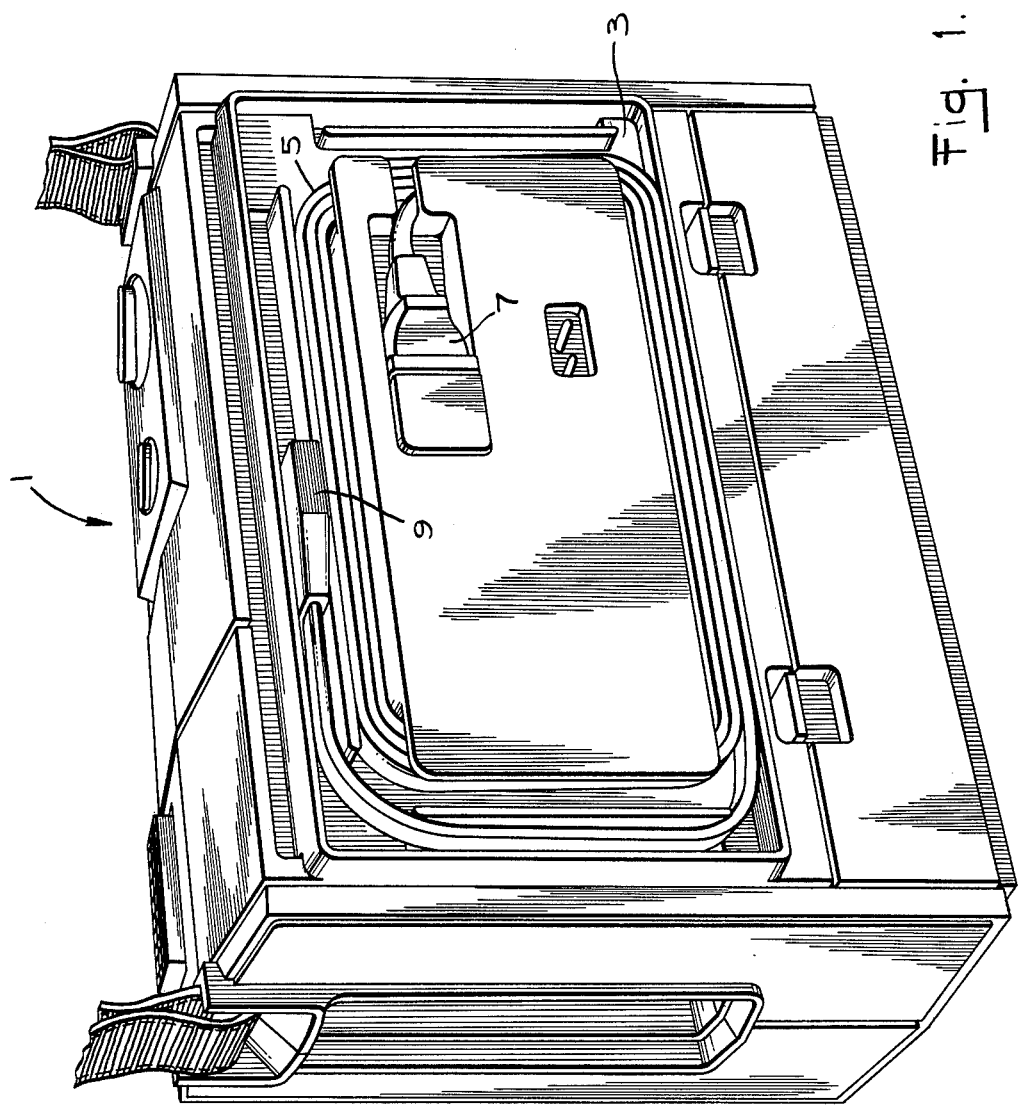
FIG. 1 is a perspective view of a tape player machine illustrating one embodiment of the integral power cord storage assembly of the present invention.

Referring to FIG. 1, there is illustrated in perspective view an eight track tape player 1 which embodies one form of the present integral power cord storage assembly on the rear surface 3 of the tape player. When the detachable power cord 5, which includes a male plug end 7 and a female jack end 9, is not being used to power the tape player, as when the set is being powered by batteries or merely being transported, the cord storage assembly provides a convenient and secure means for storing the cord.

Figure 2:
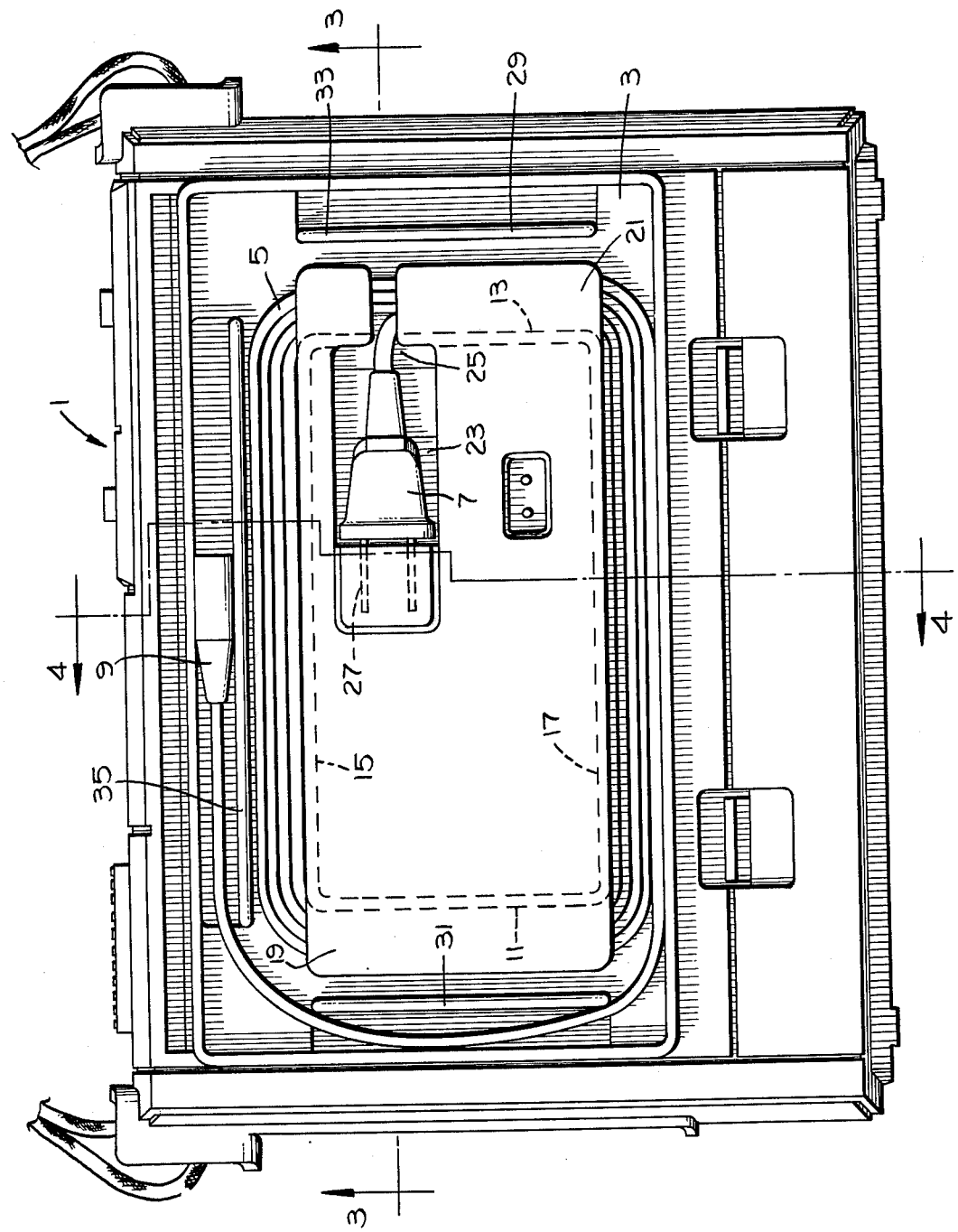
FIG. 2 is a rear elevation view of the tape player of FIG. 1.
Figure 3:
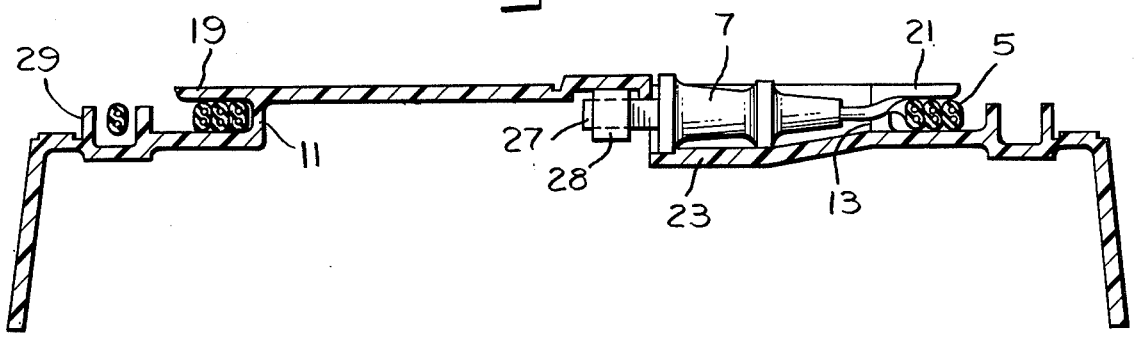
FIG. 3 is a partial cross-sectional view taken along the line 3—3 in FIG. 2.
Figure 4:
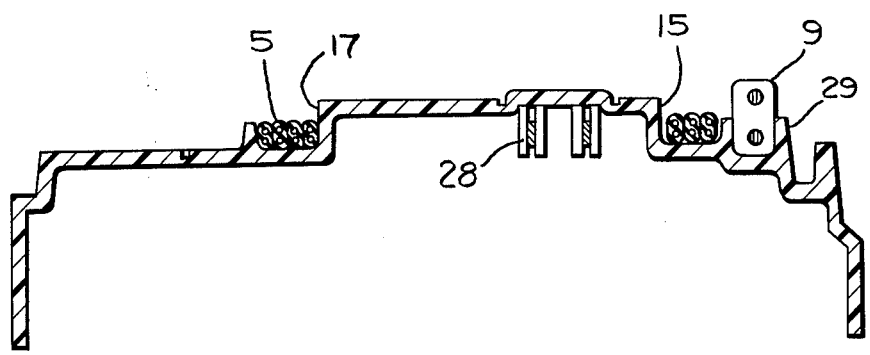
FIG. 4 is a partial cross-sectional view taken along the line 4—4 in FIG. 2.

As more clearly seen in the rear view of FIG. 2 and the partial cross-sectional views of FIGS. 3 and 4, the cord storage assembly includes a four sided walled enclosure comprising a pair of vertical sides 11 and 13 and a pair of horizontal sides 15 and 17, which are joined together and extend at approximately right angles to the rear surface 3. The cord 5 is wrapped around these sides and held in place between rear surface 3 and overhanging flanges 19 and 21 which extend out from sides 11 and 13, respectively.

A well 23 serves as a repository for the male plug 7. At one end of the well bordered by side 13 there is provided an opening 25 through which the power cord can pass. At the other end of the well are provided a pair of narrow, spring loaded grooves into which the plug prongs 27 are inserted for securing the plug. The prongs are held between plastic springs 28 as shown in FIG. 4.

Three pair of parallel rib structures are provided for securing the female jack 9. These include a peripheral rib 29, which is a continuous structure extending around the outside of the walled enclosure, and three straight ribs 31, 33 and 35 which are positioned between the peripheral rib 29 and the sides 11, 13 and 15, respectively. The straight ribs extend parallel to the associated portions of the peripheral rib across from them, with the spacing between the parallel rib structures corresponding to the thickness or width dimension of the female jack 9, in this instance the thickness of the jack, so as to securely hold the jack in place by means of surface friction. By arranging parallel rib structures about several sides of the walled enclosure, different length power cords can be stored with means provided for readily capturing both the male and female ends of the cord.

Figure 5:
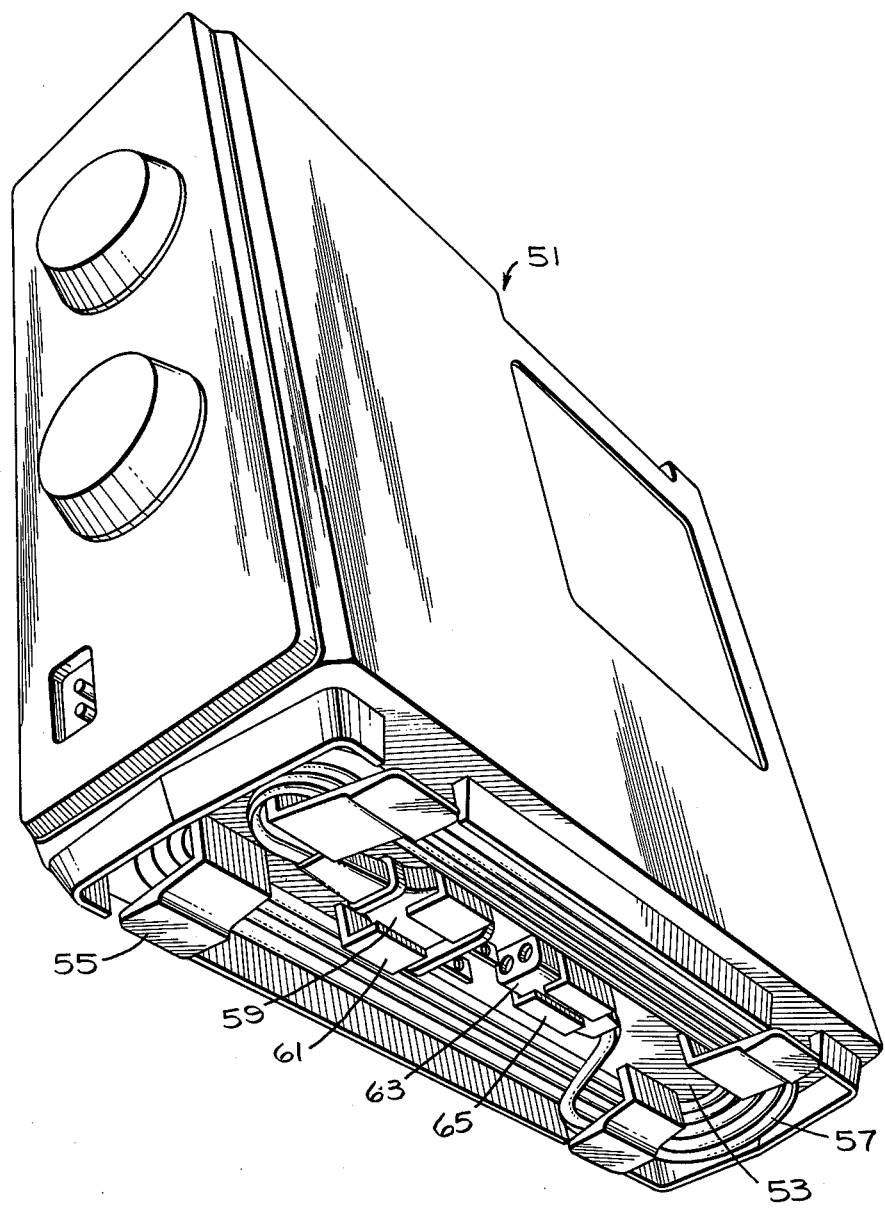
FIG. 5 is a perspective view of a tape player machine illustrating a second embodiment of the integral power cord storage assembly of the present invention.

With reference to FIG. 5, there is shown a perspective view of a cassette tape player 51 which includes on its bottom surface 53 a second embodiment of a power cord storage assembly, in accordance with the invention. In this embodiment, the cord storage assembly comprises four outwardly projecting posts 55 around which the power cord 57 is wrapped. The male plug end 59 is held by a first pair of inwardly projecting L shaped members 61 and the female jack end 63 is held by a second pair of inwardly projecting L shaped members 65.

Figure 7:
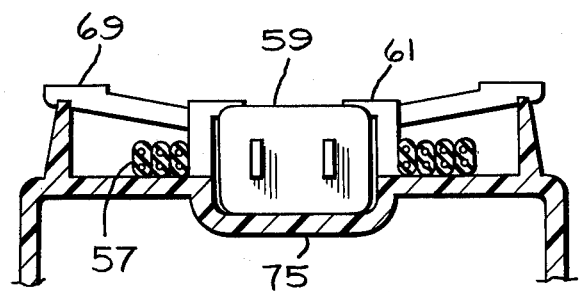
FIG. 7 is a partial cross-sectional view taken along the line 7-7 in FIG. 6.
Figure 6:
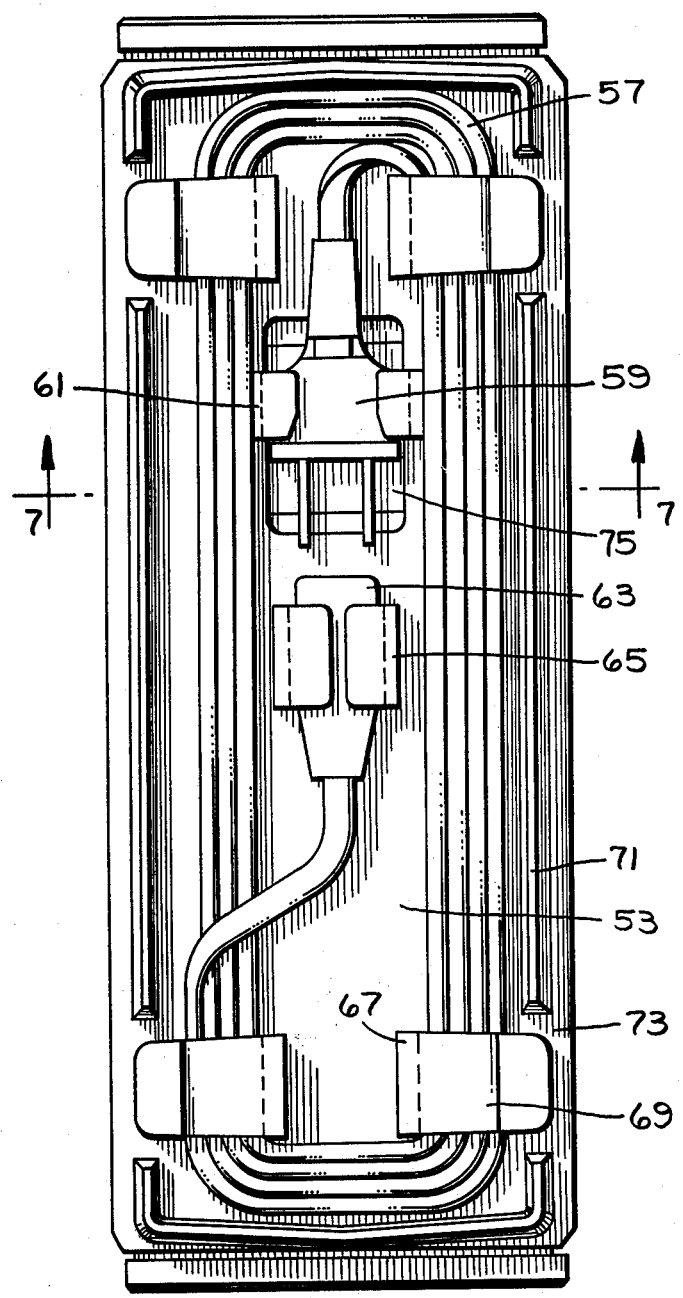
FIG. 6 is a bottom plan view of the tape player of FIG. 5.

As seen from FIG. 5, the bottom plan view of FIG. 6 and the cross-sectional view of FIG. 7, the posts 55 include principal sections 67 extending at approximately right angles to the bottom surface 53 of the tape player, and flange sections 69 which extend outwardly and are disposed generally parallel to the surface 53. The inside surfaces of the sections 67 serve as the wrapping surface about which the cord 57 is wound, the cord being held in place between the bottom surface 53 and the flanges 69. A peripheral rib structure 71 constructed around the periphery of the bottom surface and having openings 73 help to hold the cord in place. The flange sections 69 and the peripheral rib 71 also serve as supporting structure for the tape player.

The male plug 59 is retained in a well 75 formed in the bottom surface, shown in FIG. 6, and secured between inwardly projecting L shaped members 61. The L shaped members 61 are spaced apart by an amount corresponding to the width of the plug 59 and have a height corresponding to the plug thickness and thereby secure the plug through surface friction. Similarly, the female jack 63 is secured by inwardly projecting L shaped members 65 which are spaced apart by an amount corresponding to the width of the jack and have a heighth corresponding to the jack thickness so as to secure the jack by means of surface friction.

In the illustrated embodiments of the invention, the cord storage assembly structures are made of a polystyrene plastic and molded as integral parts of the tape player housing of the same material. The cord storage structure can also be fabricated separately and attached to the housing.

Although the invention has been described with respect to specific embodiments for the purpose of full and clear disclosure, the appended claims are intended to include within their meaning all modifications and changes that may reasonably be said to fall within the true scope of the invention.

What we claim as new and desire to secure by Letters Patent of the United States is:

1. A storage assembly for storing on an external surface of a portable electrical device a detachable power cord having male and female ends, comprising:
    a. a wrapping surface extending at approximately right angles to said external surface and arranged to provide a closed path on said surface,
    b. at least a portion of said wrapping surface having an outwardly projecting overhanging extension disposed approximately parallel to said external surface,
    c. first means joined to said external surface for securing the female end of the power cord, and
    d. second means joined to said external surface for securing the male end of the power cord, whereby said power cord can be wrapped around said wrapping surface and held in place between said external surface and overhanging extension with its male and female ends secured.

2. A storage assembly as in claim 1 wherein said wrapping surface is composed of the outer surface of a four-sided walled enclosure and the overhanging extension is composed of a pair of flanges joined to the opposite sides of said walled enclosure.

3. A storage assembly as in claim 2 wherein said first means includes outside said walled enclosure at least one pair of parallel rib structures spaced apart by an amount corresponding to a dimension of the female end so as to securely hold said female end in place, said rib structure accommodating different length cords.

4. A storage assembly as in claim 3 wherein three pair of parallel rib structures are provided to the outside of three sides of said walled enclosure.

5. A storage assembly as in claim 4 whrein said second means includes within said walled enclosure as well and a pair of spring loaded grooves for receiving said male end.

6. A storage assembly as in claim 5 that is constructed integrally with the housing of said electrical device.

7. A storage assembly as in claim 1 wherein said wrapping surface and overhanging extension are composed of a plurality of outwardly projecting posts.

8. A storage assembly as in claim 7 wherein said first means includes within said closed path a pair of inwardly projecting L shaped members for grasping said female end.

9. A storage assembly as in claim 8 wherein said second means includes also within said closed path a well and a further pair of inwardly projecting L shaped members for grasping said male end.

10. A storage assembly as in claim 9 that is constructed integrally with the housing of said electrical device.

* * * * *